Oct. 16, 1962 A. SNIJDERS 3,059,127

REACTANCE LOGICAL CIRCUITS WITH A PLURALITY OF GROUPED INPUTS

Filed Sept. 21, 1959 7 Sheets-Sheet 1

INVENTOR
ANTONIE SNIJDERS
BY
AGENT

INVENTOR
ANTONIE SNIJDERS
BY Frank R. Jufani
AGENT

INVENTOR
ANTONIE SNIJDERS
BY
Frank R. Jeifari
AGENT

INVENTOR
ANTONIE SNIJDERS
BY Frank R. Jinfari
AGENT

INVENTOR
ANTONIE SNIJDERS
BY [signature]
AGENT

INVENTOR
ANTONIE SNIJDERS
BY
Frank R. Jeffers
AGENT

Oct. 16, 1962 A. SNIJDERS 3,059,127

REACTANCE LOGICAL CIRCUITS WITH A PLURALITY OF GROUPED INPUTS

Filed Sept. 21, 1959 7 Sheets-Sheet 7

INVENTOR
ANTONIE SNIJDERS
BY
AGENT

United States Patent Office 3,059,127

Patented Oct. 16, 1962

3,059,127

REACTANCE LOGICAL CIRCUITS WITH A PLURALITY OF GROUPED INPUTS

Antonie Snijders, The Hague, Netherlands, assignor, by mesne assignments, to De Staat der Nederlanden, ten deze vertegenwoordigd door de directeur-generaal der Posterijen, Telegrafie en Telefonie, The Hague, Netherlands Filed Sept. 21, 1959, Ser. No. 841,164

5 Claims. (Cl. 307—88.5)

This invention relates to logical circuits comprising at least one output and a plurality of inputs, the latter of which can be subdivided into two groups each of at least one input; the circuits react to an abrupt change or a jump in the voltages of one or more of their inputs such that a pulse exceeding a determined voltage level is delivered or not delivered as a function of the voltages applied to the inputs with constant voltages up to the moment when this jump or these jumps occur, said circuit comprising a reactance (capacitor, inductance coil or transformer) each end of which is connected via a resistor to a point of constant potential, whilst each input of one group of inputs is connected via a diode to one end of the reactance and each input of the other group of inputs is connected via a diode to the other end of the reactance, all of the diodes having the same forward direction with respect to the reactance (all the forward directions directed towards the reactance or all the forward directions directed from the reactance), whilst the output is connected to one end of the reactance. Such a circuit may be used in numerous logical networks of which in this specification reference will be made for the time being to the bistable trigger circuit and the shift register. It is also possible for two or more such circuits to be connected in series.

In order that the invention may be readily carried into effect, it will now be described in detail, by way of example, with reference to the accompanying drawings, in which.

Figure 4A:
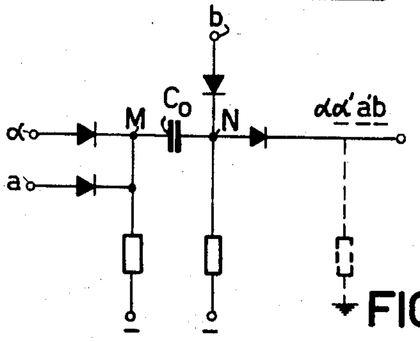
Figure 4B:
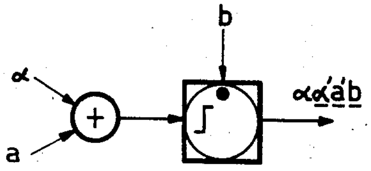
Figures 5A, 5B:
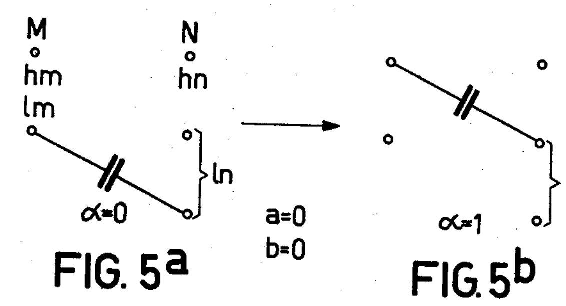
Figures 6A, 6B:
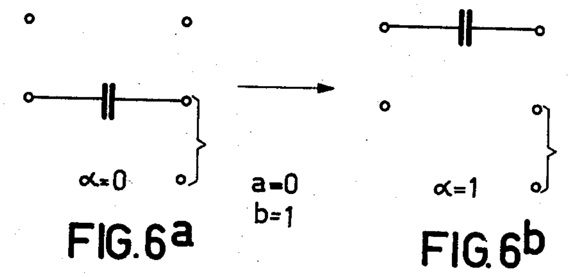
Figures 7A, 7B:
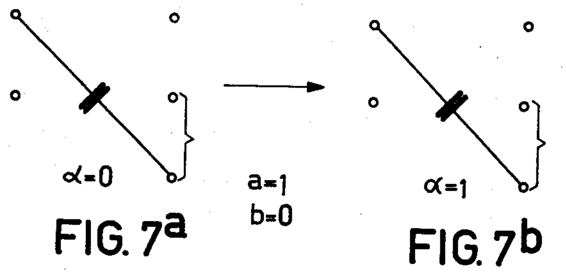
Figure 9:
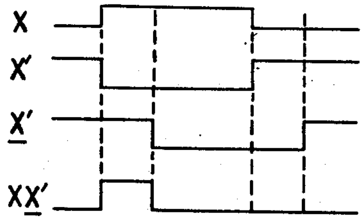
Figure 10A:
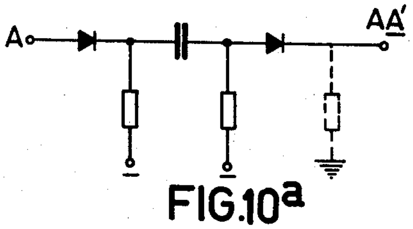
Figure 10B:
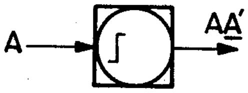
Figure 11A:
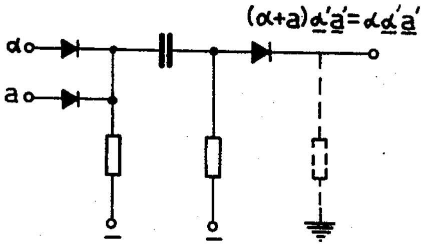
Figure 11B:
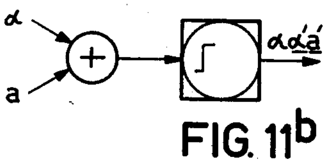
Figure 12A:
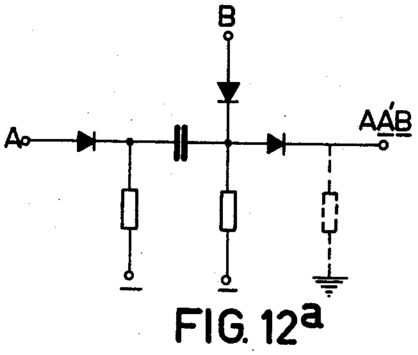
Figure 12B:
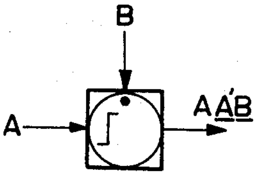
Figures 13A, 13B:
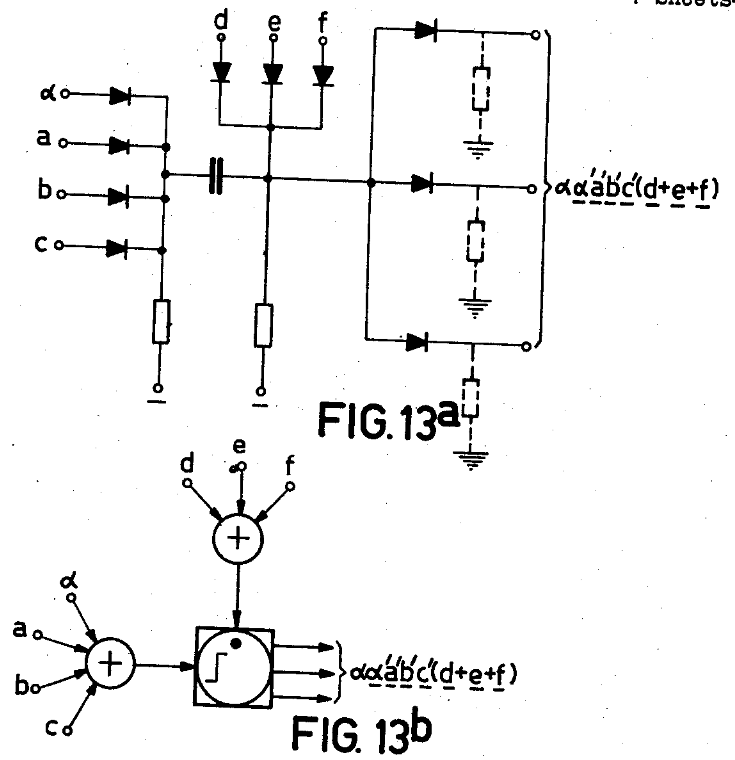
Figure 14A:
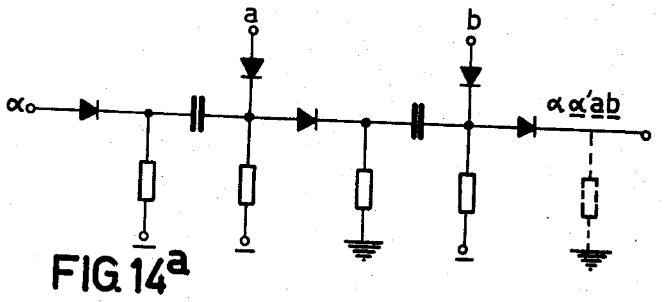
Figure 14B:
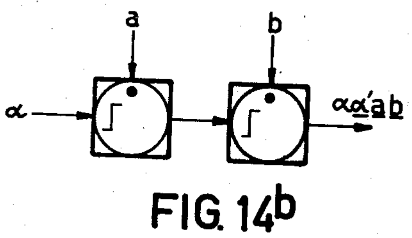
Figure 15A:
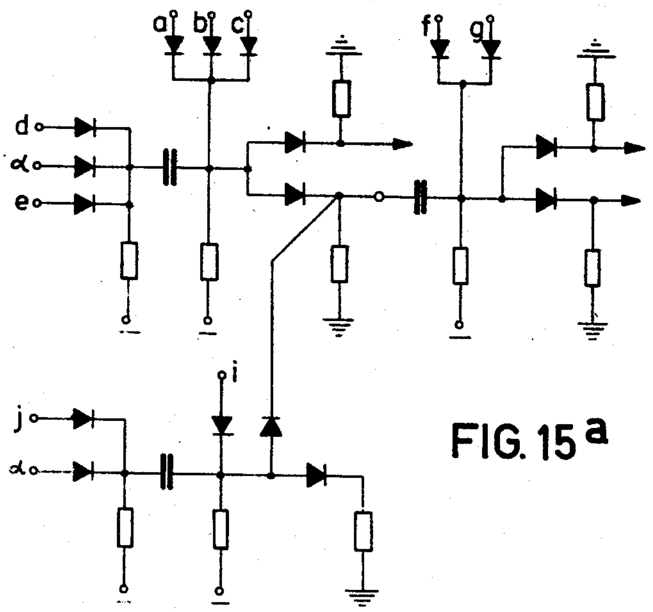
Figure 15B:
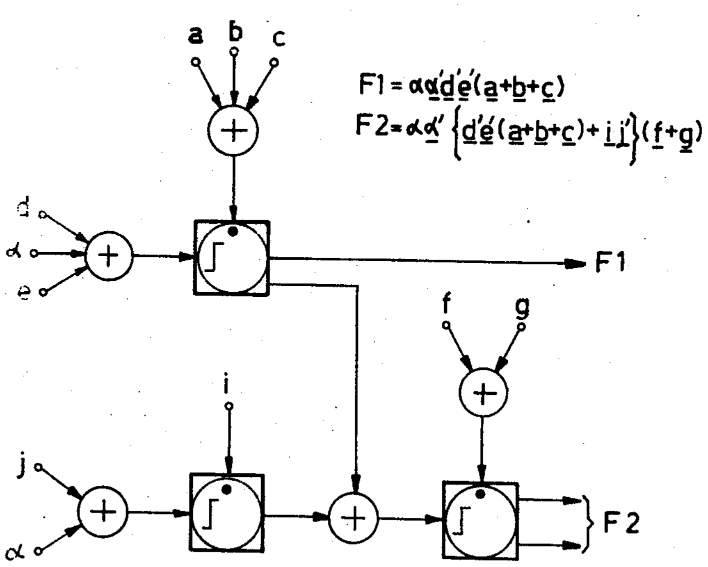
Figure 16A:
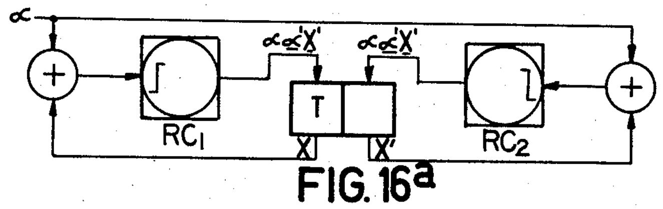
Figure 16B:
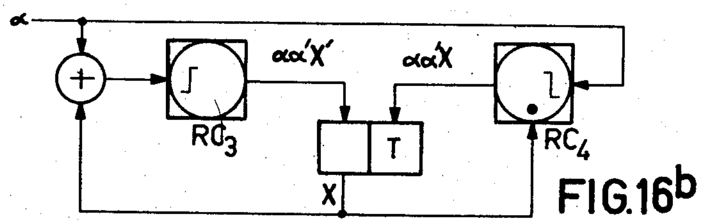
Figures 17, 18:
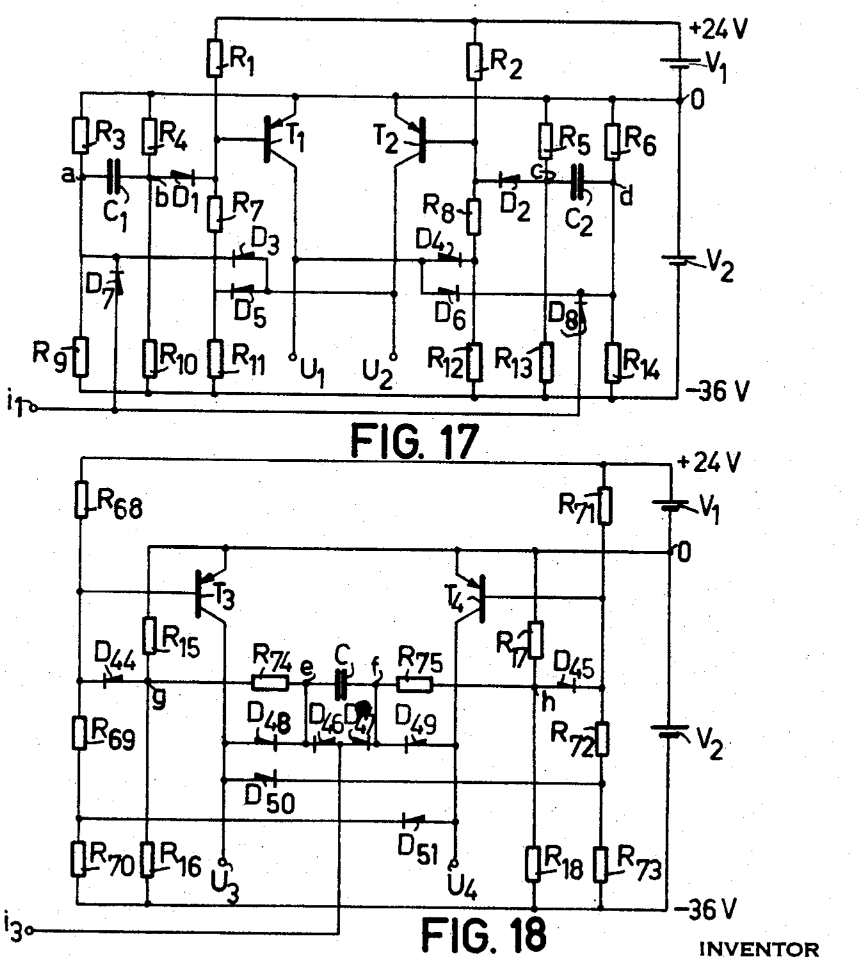
Figure 19:
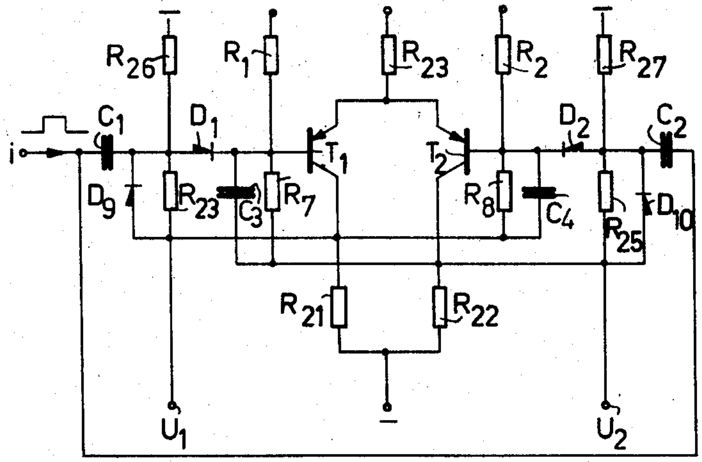
Figure 20:
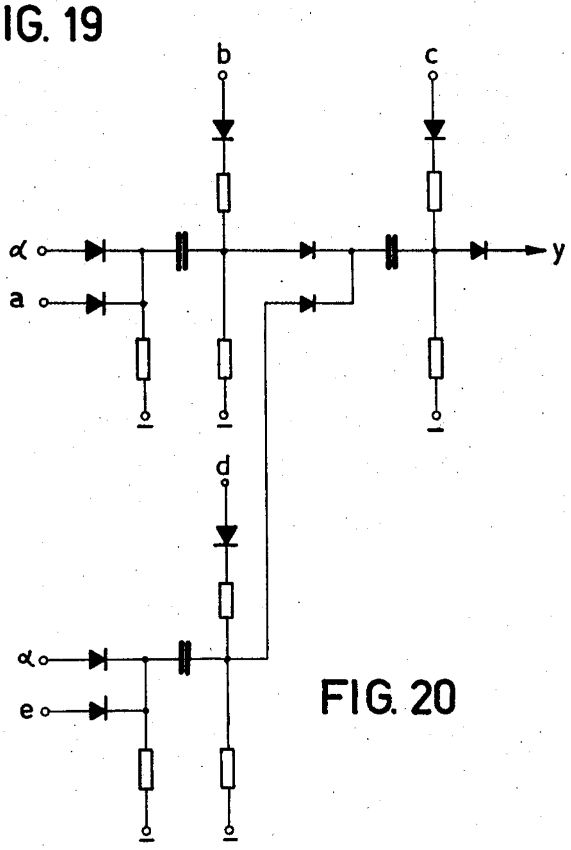

FIGS. 4*a* and 4*b* show an element for inverting and delivering peaks or for discriminating flanks, in this case especially circuited for producing the function $\alpha\alpha'a'b$; as in all the other figures, except in FIGS. 5 to 9 and 16 to 20, the *a*-portion shows an elaborated circuit, while the *b*-portion is the representation in symbolic notation specially chosen for this purpose;

FIGS. 5 to 8 show several operational positions in which a capacitor is used in the basic element, the *a*-figures showing the positions directly before the occurrence of the potential jump at the terminal M and the *b*-figures showing the positions during the pulse and during the relaxation time;

FIG. 9 shows a time diagram;

FIGS. 10 to 13 show examples for producing dynamic functions;

FIG. 14 shows a series-combination of reactance cells;

FIG. 15 shows an example for producing a composite switching function;

FIGS. 16*a* and 16*b* show an example of a frequency halving circuits;

FIG. 17 shows an elaborated frequency halving circuit;

FIG. 18 shows a circuit yielding the same result as that of FIG. 14, but in which the number of switching capacitors is reduced by 50%;

FIG. 19 shows a variant of FIG. 14 with the supply at the rear side of the capacitors, and FIG. 20 shows a diagram of a basic element.

Figure 1:
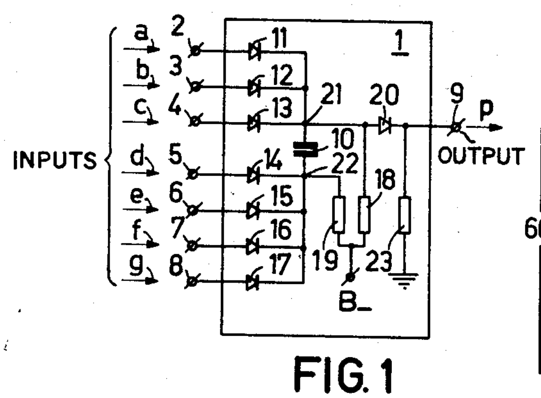
FIG. 1 shows the diagram of one embodiment of the invention.

Referring now to FIG. 1, a block 1 shows an example of a circuit according to the invention. This block has seven inputs 2, 3, 4, 5, 6, 7, 8 and one output 9. The inputs are subdivided into a group of three equivalent inputs 2, 3, 4 and a group of four, likewise equivalent, inputs 5, 6, 7, 8. These inputs have supplied to the bivalent signals *a, b, c, d, e, f, g*. The two values of these signals correspond to a voltage at a high level (signal value 1) and a voltage at a low level (signal value 0). Let it be assumed that the high level is earth potential and that the low level is a potential of value *e* which is negative with respect to earth potential. The output signal, which is referred to as *p*, is likewise bivalent. The signal value 1 corresponds to a positive pulse exceeding earth potential and the signal value 0 corresponds to a pulse not exceeding earth potential. The circuit is such that the output signal *p* has the value 1 if at least one of the three signals *a, b, c* has the value 1, if all four signals *d, e, f, g* have the value 0 and if at least one of these four signals jumps from the value 0 to the value 1. In all other cases, the output signal has the value 0.

FIG. 1 also shows a possible embodiment of the circuit. The aforementioned reactance is a capacitor 10, one electrode of which is connected via a resistor 18, and the other electrode of which is connected via a resistor 19 to a negative voltage source B having a voltage *e*. Each of the three inputs 2, 3, 4 is connected, via a diode having forward direction directed towards the capacitor, to the first-mentioned electrode of capacitor 10. These are the diodes 11, 12, 13. Similarly, the four input terminals 5, 6, 7, 8 are connected via diodes 14, 15, 16, 17 to the other electrode of capacitor 10. The output 9 is connected, via a diode 20 having forward direction directed from the capacitor, to the first-mentioned electrode of capacitor 10. The point at which one electrode of capacitor 10, the diodes 11, 12, 13 and resistor 18 meet is referred to as point 21, and the point at which the other electrode of capacitor 10, the diodes 14, 15, 16, 17 and resistor 19 meet is referred to as point 22. If desired, the output 9 is connected to earth via a resistor 23.

It will readily be appreciated that point 21 has a high potential (=earth potential) if at least one of the signals *a, b, c* has the value 1 and that point 22 has a high potential if at least one of the signals *d, e, f, g* has the value 1. However, if $a=b=c=0$, point 21 has a low potential ($-e$V) and if $d=e=f=g=0$ point 22 has a low potential.

Let it be assumed that only the signal *g* led to input 8 can jump from the value 0 to the value 1, or conversely from the value 1 to the value 0, whereas the other signals *a, b, c, d, e, f*, are constant and hence either continuously have the value 1 or continuously have the value 0. For the sake of simplicity, a jump of the signal *g* from the value 0 to the value 1 is called a positive jump and one from the value 1 to the value 0 is called a negative jump. Now, the following cases are possible:

(1) *a* or *b* or *c* has the value 1; *d* or *e* or *f* has the value 1; *g* shows a positive jump.

(2) *a* or *b* or *c* has the value 1; *d* or *e* or *f* has the value 1; *g* shows a negative jump.

(3) *a* or *b* or *c* has the value 1; *d, e* and *f* have the value 0; g shows a positive jump.

(4) *a* or *b* or *c* has the value 1, *d, e* and *f* have the value 0; *g* has a negative jump;

(5) *a, b* or *c* have the value 0; *d* or *e* or *g* has the value 1; *g* shows a positive jump;

(6) *a, b* and *c* have the value 0; *d* or *e* or *g* has the value 1; *g* shows a negative jump;

(7) *a, b* and *c* have the value 0; *e* and *f* have the value 0; *g* shows a positive jump;

(8) *a, b* and *c* have the value 0; *d, e* and *f* have the value 0; *g* shows a negative jump.

Now, in the cases 1, 2, 3 and 4 before the jump in the signal $g$ and sufficient time after the occurrence of this jump, point 21 has a high potential and in the cases 5, 6, 7 and 8, it has a low potential. Point 22 has a high potential in the cases 1, 2, 5 and 6 both before and after the occurrence of the jump in the signal $g$. Thus, the jump does not change the potential of this point. In the cases 3 and 7, however, the jump in the signal $g$ results in the potential of point 22 jumping from the low value to the high value, since in these cases before the occurrence of the jump, $d=e=f=g=0$ and, after the occurrence of the jump, $d=e=f=0$, $g=1$ (hence $d$ or $e$ or $f$ or $g$ has the value 1). In the cases 3 and 7 there occurs, due to the jump in potential at point 22, a positive pulse at point 21, the amplitude of which is approximately equal to the magnitude of the jump in the potential of point 22 and hence approximately equal to $e_0$. In case 3, this pulse originates from the high potential and is thus passed by diode 20 as a positive pulse to the output 9. In case 7, this pulse originates from the low potential so that its peak does not exceed the high potential and the pulse is not passed by the diode. In the cases 4 and 8, the jump in the signal $g$ results in the potential of point 22 jumping from the high value to the low value. In fact, before the occurrence of the jump, $d=e=f=0$, $g=1$ ($d$ or $e$ or $f$ or $g$ has the value 1) and after the occurrence of the jump $d=e=f=g=0$. This jump in the potential of point 22 brings about a negative pulse at point 22, but this negative pulse cannot pass through diode 20. It thus appears that the output signal has the value 1 only in case 3 and has the value 0 in all the other cases.

If resistor 23 is omitted, pulses not exceeding the high potential may also occur at the output 9, these latter pulses corresponding to the signal value 0. If the diode 20 is also omitted, the output signal may also contain negative pulses which, however, likewise correspond to the signal value 0. In addition, it can readily be appreciated that the reactance may alternatively be an inductance coil or a transformer. In the last-mentioned case, the inputs must be connected to the ends of one winding and the output or outputs must be connected to one end or to the ends of the other winding of the transformer.

Figure 2:
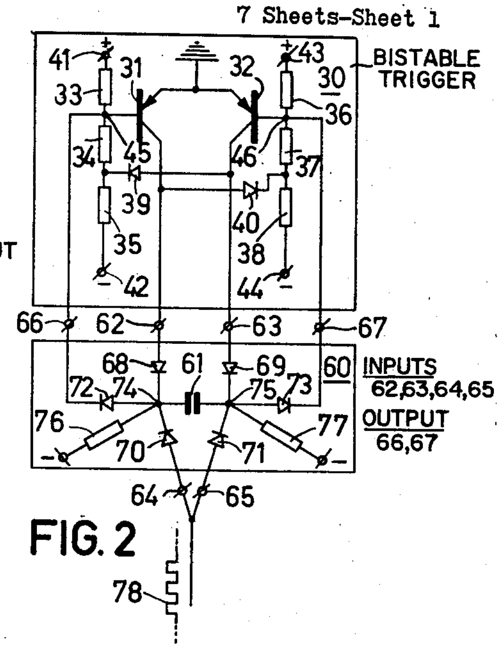
FIG. 2 shows a bistable trigger circuit which utilises a circuit according to the invention and which may also serve as a frequency-halving circuit.

FIG. 2 shows the use of a circuit according to the invention for obtaining a bistable trigger circuit which changes-over due to the leading edges of a block signal. This circuit also fulfils the function of a frequency-halving circuit. In this figure, reference numeral 30 indicates a bistable trigger circuit as described, for example, in the article by J. E. Flood, Junction-Transistor Trigger Circuits (Wireless Engineer, May 1955, pages 122–130). This trigger circuit comprises two inputs 66 and 67 and two outputs 62 and 63 and includes two transistors 31, 32, six resistors 33, 34, 35, 36, 37, 38 and two diodes 39 and 40, which diodes may also be omitted, if desired. Said circuit elements are connected together in the manner shown in the figure and the performance of this circuit is described in the above-mentioned article so that it need not be considered in this specification. In addition, 60 indicates a logical circuit according to the invention having four inputs 62, 63, 64, 65, which can be subdivided into two groups 62, 64 and 63, 65, and two outputs 66, 67. The reactance is again a capacitor 61, the two electrodes of which are connected via resistors 76 and 77 respectively to a point of negative potential. FIG. 2 shows in what manner the outputs of the trigger circuit 30 are connected to two different inputs of the logical circuit and the outputs of the logical circuit 60 are connected to the inputs of the trigger circuit. The two other different inputs 64, 65 of logical circuit 60 are connected together and receive a block signal 78.

This circuit operates as follows. Let it be assumed that, at a certain moment, transistor 31 is conducting and transistor 32 cut off. Terminal 62 then is at earth potential and terminal 63 has a negative potential. When the potentials at the terminals 64 and 65 suddenly increase upon the occurrence of the subsequent leading edge of the block signal, positive pulses occur at the junction points 74 and 75 between the electrodes of capacitor 61 and the inputs and outputs of logical circuit 60. However, only the pulse which occurs at point 74 exceeds earth potential so that only the base of transistor 31 receives a pulse falling within the positive range. Consequently, transistor 31 is cut off and transistor 32 becomes conducting, that is to say, the trigger circuit 30 is changed over. Upon the next-following leading edge of the block signal the trigger circuit 30 returns for analogous reasons to its initial position.

Figure 3:
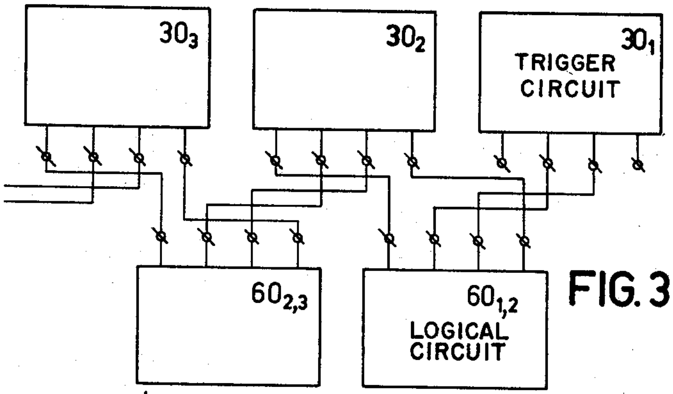
FIG. 3 shows a shift register which utilises circuits according to the invention.

FIG. 3 shows the first sections of a shift register built up from trigger circuits $30_1$, $30_2$, $30_3$ . . . and logical circuits $60_{1,2}$, $60_{2,3}$ . . . of the types in FIG. 2, together with the manner in which the inputs and outputs of these circuits must be connected together. The inputs of the first trigger circuit $30_1$ of the shift register are also the inputs of the shift register as a whole. The outputs of the last trigger circuit $60_n$ are also the outputs of the shift register as a whole.

In FIG. 4*a*, capacitor $C_0$ is charged during an interval with information determined by the conditions $a$ and $b$ and this reactance begins to discharge during control pulses, these pulses being supplied to one electrode of the capacitor and its other electrode, due to the charge through the said information, delivering a voltage peak which is approximately synchronous with the control peak and which may have an amplitude which is small or great as a function of this information.

Figures 8A, 8B:
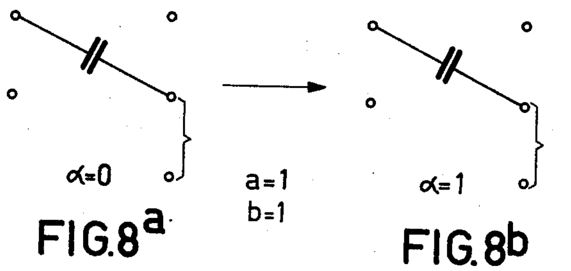

The manner in which said peaks are obtained is illustrated in FIGS. 5 to 8, which represent successively the conditions supplied to points M and N during one of the said intervals, that is to say, the voltages of these points vary between high level $h$ and low level $l$ and only with suitable relative location of the levels during a clock pulse at one point does an output level occur at the other point (FIG. 8*b*).

FIG. 14 shows the series-combination of a plurality of reactance cells to which a clock pulse $\alpha$ is supplied and at the output of which the function $\alpha\alpha'ab$ is obtained due to the conditions $a$ and $b$ being supplied to the intermediate points.

FIGS. 5*a* to 8*b* show in what manner the voltages at point N vary during the clock pulse $\alpha$ at point M in the circuit of FIG. 4.

FIG. 15 shows an example of the use of the dynamic pulse technique by means of reactance cells according to the invention. This circuit permits of producing the following switching function:

$$[\{ij'+(a+b+c)d'e'\}(f+g)'] \quad (i'+j)(a'b'c'+d+e)+f'g'$$

This function is obtained dynamically during the occurrence of the clock pulse. It could be obtained statically, by means of diodes according to the formula:

$$D_2^+[D_3^\cdot(f'g')],\ D_2^\cdot\{D_2^+(i',j)\},\ D_3^+[d,e,D_3^\cdot(a'b'c')]$$

wherein D is a symbol for a diode, the "+"-sign refers to an "and"-circuit and the "."-sign refers to a "time" circuit. Statically, the composition of this function would require the use of 15 diodes with associated resistors. The dynamic technique thus affords a simplification, which is even more evident when of several functions occurring in the result, such as $f'$ and $g'$, only the inverses $f$ and $g$ are given.

FIG. 17 shows a bi-divider, in which capacitors $C_1$ and $C_2$ form parts of reactance cells of the invention. These cells in this example have a flank-discriminating action and thus enable to derive from points $u_1$ and $u_2$ a frequency half of that supplied to point $i$. This will be explained in detail hereinafter. For the time being, it is mentioned only that at points $a$ and $d$ "and"-actions are produced with regard to the supplied pulse $\alpha$ and the trigger position, which are led via diodes $D_3$ and $D_6$ respectively.

In FIG. 18, the capacitors $C_1$ and $C_2$ are replaced by a single capacitor C, but as mentioned with FIG. 17, this capacitor may likewise have a flank-discriminating action.

FIG. 19 is a variant of FIG. 17, but in this example the functions to be summated are supplied to opposite electrodes of the capacitors $C_1$ and $C_2$.

The switching pulse $\alpha$ reaches the capacitors $C_1$ and $C_2$ with equal distribution. Assuming that the trigger circuit constituted by transistors $T_1$ and $T_2$ occupies the position in which $T_2$ is open, then the collector of $T_2$ is positive and in this phase a voltage is applied to the left-hand side of capacitor $C_2$, thus causing on it an indicated charge. Upon arrival of the pulse, only the base of $T_2$ becomes positive and the trigger changes-over. Thus, the functions to be summated are in this case the said switching pulse and the instantaneous voltages at the collectors; the resistors $R_1$–$R_{25}$ determine the no-load voltages.

In FIG. 16, FIG. 16*a* shows symbolically the performance of the bi-divider of FIG. 17, whereas FIG. 16*b* shows a variant. The central rectangles T represent triggers which include transistors $T_1$ and $T_2$ in FIGS. 17 to 19. The squares $RC_1$ to $RC_4$ with their circles represent reactance cells according to the invention.

FIG. 9 shows a time diagram to clarify the significance of the function $XX^1$: the function $X^1$ is the inverse of a function X and the function $X^1$ is the delayed function $X^1$. The section $XX^1$ differs from zero only during the relaxation time after the occurrence of the function X.

For the sake of completeness, we now revert to the circuits shown in FIGS. 17 to 19.

The 2-stage counting circuit shown in FIG. 17 comprises two transistors $T_1$ and $T_2$ included in a bistable circuit. For this purpose, the emitters of the two transistors are connected to an earthed tapping on a voltage source $V_1+V_2$. Between the positive terminal of this voltage source, which has a voltage of +24 volts with respect to earth, and the negative terminal of this voltage source, which has a voltage of −36 volts with respect to earth, resistors $R_1/R_7/R_{11}$ and $R_2/R_8/R_{12}$, respectively, are arranged in series in the first and the second stage, respectively. The bases of transistors $T_1$ and $T_2$, respectively, are connected to the coupling points of the resistors $R_1/R_7$ and $R_2/R_8$, respectively. In the first stage, an output terminal $u_1$ connected to the collector of transistor $T_1$ is coupled via a diode $D_4$ to the coupling point of resistors $R_8$ and $R_{12}$. In the second stage, an output terminal $u_2$ connected to the collector of transistor $T_2$ is coupled via a diode $D_5$ to the coupling point of resistors $R_7$ and $R_{11}$. The resistors $R_1$, $R_7$ and $R_{11}$ are equivalent to the resistors $R_2$, $R_8$ and $R_{12}$ and are in the proportion of, for example, 10:1:5, so that the coupling points have a negative potential. The voltages and resistors are chosen so that the saturation value of the collector currents of the transistors in the conducting state is not reached. This implies that the voltage drop across the emitter-collector path of each conducting transistor is small.

The bistable circuit described is converted into a counting circuit by the addition of a connecting network to each stage. The network associated with the first stage comprises a capacitor $C_1$ and voltage dividers $R_3/R_9$ and $R_4/R_{10}$, arranged between the earthed tapping on the voltage source and the negative terminal. The left-hand electrode of capacitor $C_1$ is connected to tapping point *a* on the voltage divider $R_3/R_9$ and the right-hand electrode is connected to tapping point *b* on the voltage divider $R_4/_{10}$. Tapping point *b* is connected via a diode $D_1$ to the base of transistor $T_1$ and tapping point *a* is connected via a diode $D_3$ to output terminal $u_2$ of the second stage. Similarly, the network associated with the second stage comprises a capacitor $C_2$ and voltage dividers $R_6/R_{14}$ and $R_5/R_{13}$, arranged between the earthed tapping on the voltage source and the negative terminal. The right-hand electrode of capacitor $C_2$ is connected to tapping point *d* on the voltage divider $R_6/R_{14}$ and the left-hand electrode is connected to tapping point *c* on the voltage divider $R_5/R_{13}$. Tapping point *c* is connected via a diode $D_2$ to the base of transistor $T_2$ and tapping point *d* is connected via a diode $D_6$ to the output terminal $u_1$ of the first stage. The pulses are supplied to an input terminal $i_1$ of the counting circuit. Terminal $i_1$ is connected to tapping point *a* via a diode $D_7$ and to tapping point *d* via a diode $D_8$. In the embodiment described, the tappings on the voltage dividers $R_3/R_9$ and $R_6/R_{14}$ are chosen so that each of the tapping points *a* and *d* have a potential of −12 volts. The tappings on the voltage dividers $R_4/R_{10}$ and $R_5/R_{13}$ are chosen so that each of the tapping points *b* and *c* have a potential of −3 volts.

Input terminal $i_1$ is connected, for example, to an output terminal of a corresponding counting circuit. If the transistor connected to this output terminal is conducting, terminal $i_1$ has a potential of about 0 volt, since the voltage drop across the emitter-collector path is small only. The potential of the tapping points *a* and *d* is then also brought to 0 volt via the diodes $D_7$ and $D_8$. If it is further assumed that transistor $T_1$ is conducting in the initial position of the counting circuit of FIG. 4, then via the coupling with diode $D_4$, transistor $T_2$ is locked in the non-conducting state. Coupling point *d*, which has a potential of 0 volt via diode $D_8$, still has this potential via diode $D_6$. The two diodes $D_1$ and $D_2$ are cut off. The capacitors $C_1$ and $C_2$ are charged to a voltage of 3 volts.

If, now, the potential of 0 volt at input terminal $i_1$ disappears due to the controlling transistor being cut off, tapping point *d* retains the potential of 0 volt via diode $D_6$. However, tapping point *a* assumes a potential of −12 volts, which provides a negative pulse at tapping point *b* via capacitor $C_1$. This otherwise remains without effect, since diode $D_1$ remains cut off. The state of conductivity of the two transistors thus remains unchanged. However, capacitor $C_1$ receives an inverse voltage, that is to say of 9 volts, since tapping point *b* again assumes a potential of −3 volts.

If the potential of input terminal $i_1$ is again brought to 0 volt, due to the controlling transistor being released, tapping point *a* suddenly acquires again a potential of 0 volt, which provides a positive pulse of 12 volts at tapping point *b* via capacitor $C_1$. Diode $D_1$ now becomes conducting and transistor $T_1$ is cut off. Tapping point *d* does not undergo any variation in potential, since it had a potential of 0 volt via diode $D_6$ and retains this potential via diode $D_8$. Via diode $D_4$, transistor $T_2$ is no longer maintained in the cut-off state and becomes conducting. Via diode $D_5$, transistor $T_1$ is then locked in the non-conducting state. Capacitor $C_1$ now again acquires a voltage of 3 volts. The counting circuit is in its second position.

After the disappearance and return of the potential of 0 volt at input terminal $i_1$, the first state is reached again with transistor $T_1$ in the conducting state.

The said circuit may serve not only as a binary counting circuit, but also, for example, as a frequency-halving circuit.

Finally, a simplified form of a 2-stage counting circuit will now be considered. Such a circuit is shown in FIG. 18. Its stages are of the same structure as in the counting circuit of FIG. 17 and include transistors $T_3$ and $T_4$. The stage including transistor $T_3$ comprises resistors $R_{68}$, $R_{69}$ and $R_{70}$ and that including transistor $T_4$ comprises resistors $R_{71}$, $R_{72}$ and $R_{73}$. However, only one connecting network is now present which is associated with both stages. It comprises a capacitor C and voltage dividers $R_{15}/R_{16}$ and $R_{17}/R_{18}$.

The left-hand electrode of capacitor C is connected via a coupling point *e* and a resistor $R_{74}$ to a tapping point *g* on the voltage divider $R_{15}/R_{16}$ and its right-hand electrode is connected via a coupling point $f$ and a resistor $R_{75}$ to a tapping point $h$ on the voltage divider $R_{17}/R_{18}$. Tapping point $g$ is in addition connected, via a diode $D_{44}$, to the base of transistor $T_3$, whereas coupling point $e$ is connected, via a diode $D_{48}$, to an output terminal $u_3$ coupled to the collector of transistor $T_3$. Tapping point $h$ is in addition connected, via a diode $D_{45}$, to the base of transistor $T_4$, whereas coupling point $f$ is connected, via a diode $D_{49}$, to an output terminal $u_4$ connected to the collector of transistor $T_4$. The coupling points $e$ and $f$ are connected via diode $D_{46}$ and diode $D_{47}$, respectively, to the pulse supply lead, which is connected to an input terminal $i_3$. Terminal $u_3$ is connected via a diode $D_{50}$ to the coupling point between the resistors $R_{72}$ and $R_{73}$ and terminal $u_4$ is connected via a diode $D_{51}$ to the coupling point between the resistors $R_{69}$ and $R_{70}$.

As in the previous cases, it will be assumed that input terminal $i_3$ initially has a potential of about 0 volt. Via the diodes $D_{46}$ and $D_{47}$, the coupling points $e$ and $f$, and hence the two electrodes of capacitor C, now also have a potential of 0 volt. Let it be further assumed that transistor $T_3$ is conducting in the initial position of the counting circuit. Via diode $D_{50}$, transistor $T_4$ is then locked in the non-conducting state. Coupling point $e$ also receives a potential of 0 volt via diode $D_{48}$. The resistors are chosen so that the potential of tapping points $g$ and $h$ is now a little negative. The diodes $D_{44}$ and $D_{45}$ are cut off.

If, now, the potential of 0 volt at input terminal $i_3$ disappears, coupling point $e$ retains its potential of 0 volt via diode $D_{48}$. However, coupling point $f$ and tapping point $h$ now assume a potential of $-12$ volts, as in the networks previously described. The state of conductivity of the two transistors remains unchanged. However, a voltage of 12 volts is set up at capacitor C.

If, now, the potential of input terminal $i_3$ is again brought to 0 volt, coupling point $f$ suddenly acquires again a potential of 0 volt, thus providing via capacitor C a positive pulse of 12 volts at coupling point $e$. The potential of tapping point $g$ thus also increases, diode $D_{44}$ becomes conducting and transistor $T_3$ is cut off. Via diode $D_{50}$, transistor $T_4$ is no longer cut off and becomes conducting. Via diode $D_{51}$, transistor $T_3$ is then locked in the non-conducting state. Capacitor C again acquires a voltage of 0 volt. The counting circuit is in its second position.

After the disappearance and return of the potential of 0 volt at input terminal $i_3$, the first position is reached again with transistor $T_3$ in the conducting state.

It needs no mentioning that it is alternatively possible to use npn-transistors instead of pnp-transistors for building up counting circuits according to the invention. In this case, it is necessary to exchange the terminal connections of the voltage source and the diodes require an inverse pass sense. The connecting networks are also usable if valves are included in the stages of the counting circuit. The resistors and the voltages at such resistors must than naturally be matched to the data of the valves.

In FIG. 19, the resistors $R_{26}$ and $R_{27}$, connected to a negative voltage source for producing a low negative bias of, for example, —2.4 volts at their lower terminals, serve to stabilize the transistors $T_1$ and $T_2$ against accidental voltage pulses.

The pulse $i$ received via capacitor $C_2$ is summated, after the relaxation time, with the collector voltage of transistor $T_2$, by means of the cell $D_{10}$.

FIG. 20 shows a circuit which produces at Y, by means of clock pulses $\alpha$, a dynamic output function which includes the inverses of primary functions $a$ and $e$, together with the stern functions $b$ and $c$.

What is claimed is:

1. A logical circuit comprising at least one output terminal and a plurality of input terminals, said input terminals being divided into a first group and a second group, a reactive element having two ends, each of said ends being connected through a respective resistor to the same point of constant potential, each input terminal of said first group being coupled through a respective diode to one end of said reactive element, each input terminal of said second group being coupled through a respective diode to the other end of said reactive element, all of said diodes being poled in the same direction with respect to said reactive element, said output terminal being coupled to one of said ends, means for applying bivalent input signals to said input terminals, an output signal of a predetermined amplitude being produced at said output terminal if there is an abrupt change in the value of at least one of the input signals applied to said second group of input terminals.

2. A logical circuit as recited in claim 1, wherein said first group comprises three input terminals and said second group comprises four input terminals.

3. A logical circuit as claimed in claim 1, including a second output terminal coupled to the other end of said element.

4. A logical circuit as claimed in claim 1, further including an output diode in the coupling between said output terminal and said element, the polarity of the output diode with respect to said reactive element being opposite to that of the diodes connected to the input terminals, said output terminal being connected to a second point of constant potential.

5. A logical circuit as claimed in claim 3, further including a separate output diode in the coupling between each output terminal and said element, the polarity of the output diodes with respect to said reactive element being opposite to that of the diodes connected to the input elements, both of said output terminals being connected to a second point of constant potential.

References Cited in the file of this patent

UNITED STATES PATENTS

| | | |
|---|---|---|
| 2,664,887 | Wolfe | July 7, 1953 |
| 2,665,845 | Trent | Jan. 12, 1954 |
| 2,903,676 | Ostendorf | Sept. 8, 1959 |
| 2,907,898 | Clark | Oct. 6, 1959 |

FOREIGN PATENTS

| | | |
|---|---|---|
| 770,616 | Great Britain | Mar. 20, 1957 |